Figure 1:
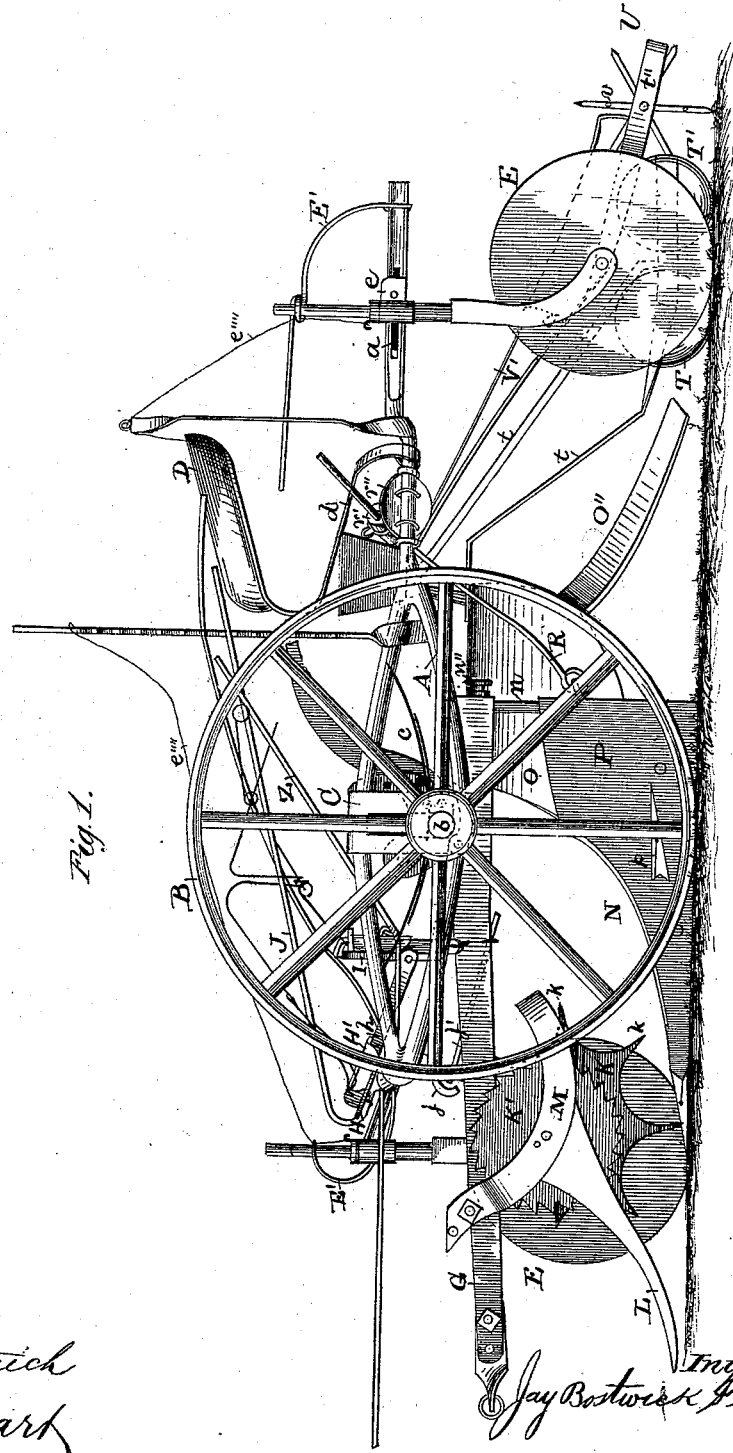

J. B. FISHER.
Sulky Plow.

No. 201,765.

Patented March 26, 1878.

Witnesses
Fred G. Dietrich
D. G. Stuart

Inventor
Jay Bostwick Fisher

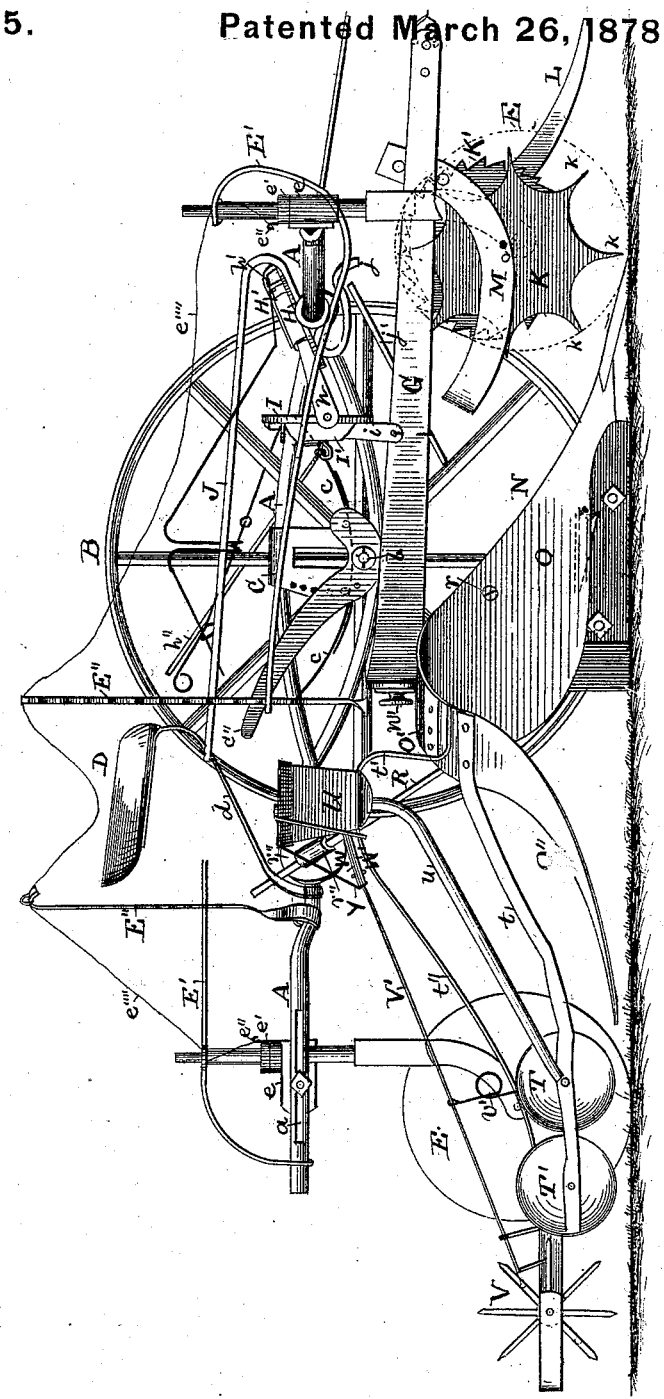

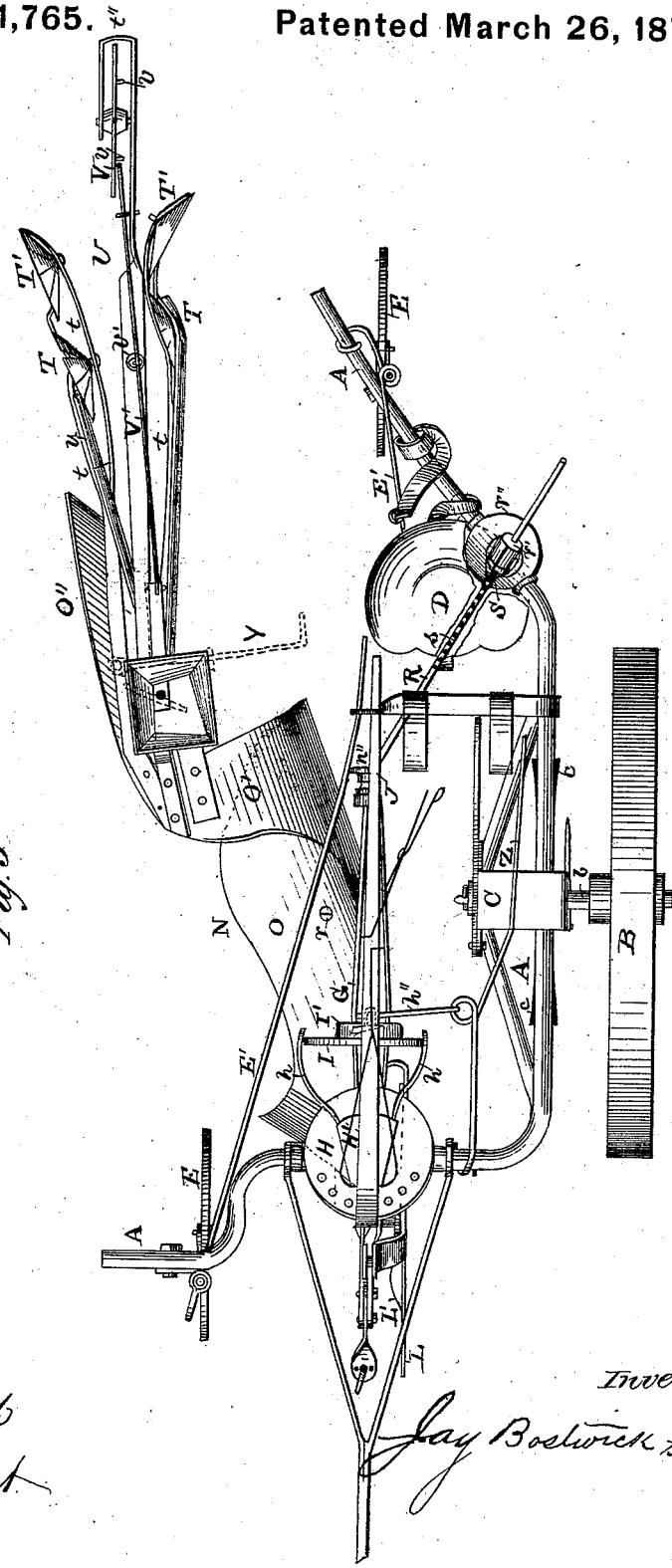

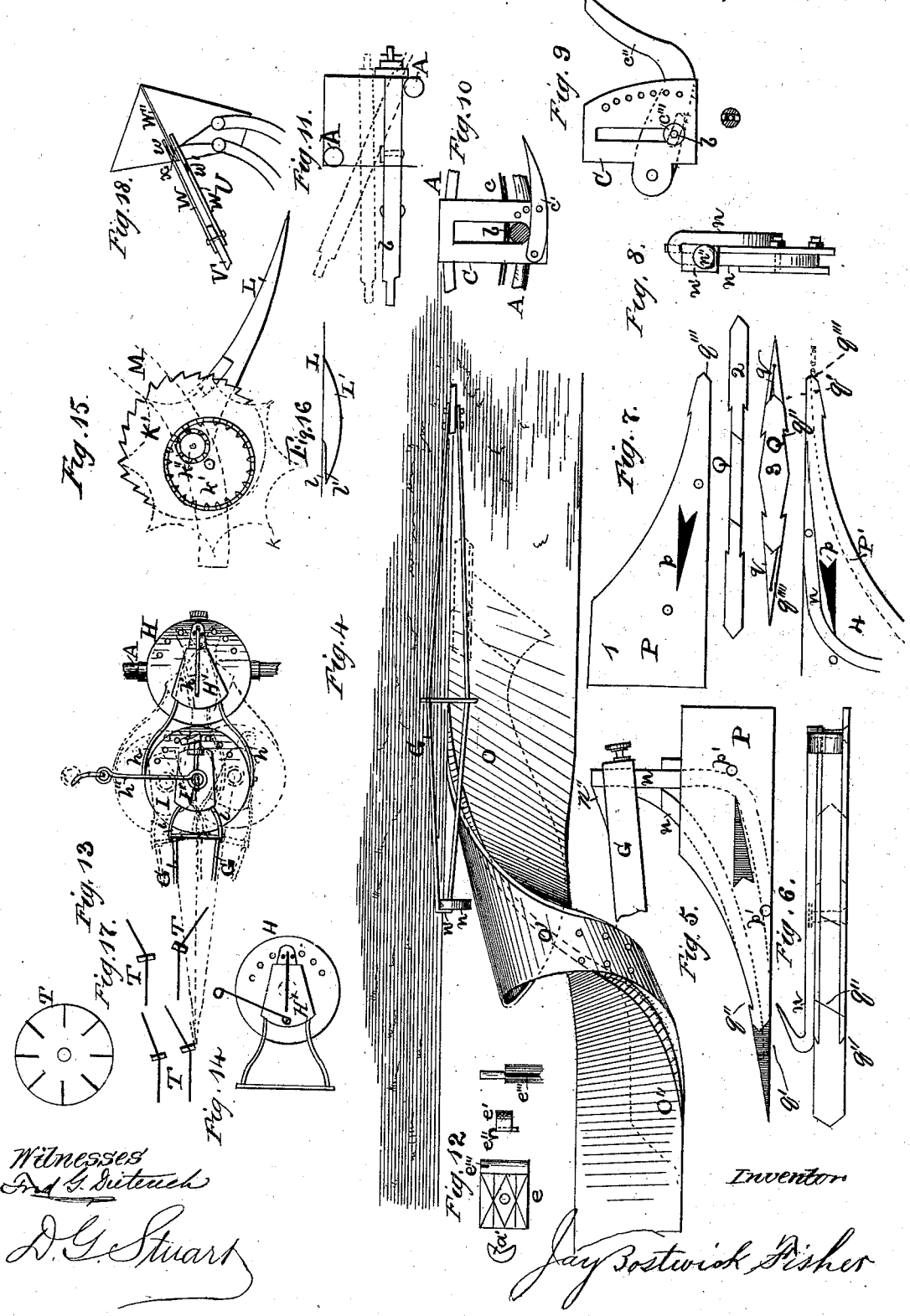

UNITED STATES PATENT OFFICE.

JAY BOSTWICK FISHER, OF DAVENPORT, IOWA.

IMPROVEMENT IN SULKY-PLOWS.

Specification forming part of Letters Patent No. 201,765, dated March 26, 1878; application filed February 2, 1878.

*To all whom it may concern:*

Be it known that I, JAY BOSTWICK FISHER, of Davenport, in the county of Scott and State of Iowa, have invented certain new and useful Improvements in Sulky-Plows; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to plows, more particularly to that class of agricultural implements commonly known as "sulky-plows," which are supported on wheels and provided with a seat for the operator.

The invention consists, primarily, of a new form of plow by means of which the strip of sod or soil is turned over smoothly or evenly to its proper bed without breaking or doubling up, and the crevice formed by the lap of the furrow partially smoothed and covered, so that a proper seed-bed is at once prepared, and the weeds or grass are prevented from growing up quickly between the furrows or joints of the furrow-slices. Seeding attachments may also be provided to drop and cover the seed as the plow moves along, and thus one passage of the machine over the field plows the land and seeds the crop.

The invention further consists in certain new features in the construction of the plow-point, the sulky-frame, and in the colter which cuts the furrow-slice in advance of the plow; and the invention further consists in certain new combinations of devices, all as hereinafter more fully set forth.

In the accompanying drawings, Figure 1 is a side elevation of the wheel side of my improved plow. Fig. 2 is a similar view of the opposite or plow side of the machine. Fig. 3 is a top or plan view of the machine. Fig. 4 is a diagram view, showing the operation of the plow in turning the furrow-slice. Fig. 5 is a detail view, showing the frame-work of the plow proper. Fig. 6 is a top or plan view of the same with the beam removed. Fig. 7 shows the parts of the plow in detail—1, the land-side plate; 2 and 3, top and side views of the plow-point, and 4 a side view of the furrow-side plate of the plow-frame with the point removed. Fig. 8 is an end view of the plow-point frame. Fig. 9 is a detail view, showing the device for adjusting the relative positions of the axle and sulky-frame. Fig. 10 is a detail view, showing the device for regulating the tension of the spring on the sulky-frame. Fig. 11 is a detail view, showing the play of the axle with relation to the spring and sulky-frame. Fig. 12 shows parts of the device which constitute the journal of the caster-wheels. Fig. 13 is a detail view of the device for adjusting the position of the plow-beam. Fig. 14 shows a modification of said device. Fig. 15 is a detail view of the colter device. Fig. 16 is a plan view of a portion of Fig. 15. Fig. 17 shows plan and side views of the disk-shaped wheels which follow after the plow. Fig. 18 illustrates the construction of the seeding device.

Referring to the parts by letters, A represents the sulky-frame, consisting of a metal bar of peculiar form, as clearly shown by Fig. 3 of the drawings. B is the supporting-wheel, which is mounted on a spindle or axle, $b$, which has its bearings on a spring and within a slotted plate or plates, C, the spindle passing through the slots, so that it may move up and down between the sides of the plate C. $c$ is a spring, having forked ends, which embrace and bear against the frame A, the middle of the spring bearing against the axle or spindle $b$ on the land-side, so as to prevent a too free motion of the wheel in a vertical direction, and yet permit of its movement in this direction when passing over uneven ground without moving the plow from its true working position. $c'$ is a small lever, by means of which the tension of the spring upon the axle may be regulated by passing a pin through it into one of a series of holes formed in the plate C, all as clearly shown by Fig. 10 of the drawings.

The position of the other end of the axle opposite to the spring is adjusted by means of a lever, $c''$, which is pivoted to the opposite side of the plate C, and through which the spindle of the axle passes, as shown at $c'''$. The movement of this lever $c''$ carries the axle with it, and it is secured in the desired position by means of a pin and holes in the plate, in the same manner as the lever $c'$, as shown by Fig. 9.

D is the driver's seat, supported by a spring-bar, $d$, secured to the frame-bar A.

E E represent two caster-wheels, which are journaled to the frame A, one in front and one in rear, the rear one being arranged to operate in the same line as the plow, and the forward one running in the old furrow. Their position is intended to prevent a lateral swing of the plow-frame A, in order to cut a straight furrow. These caster-wheels are attached to the frame by means of boxes $e$, said boxes being adjustably secured to the frame A by means of bolts and nuts, the bolts passing through slots $a$ formed in the frame, and these slotted portions of the frame being grooved, as clearly shown at $a'$, Fig. 12, so as to afford a firmer bearing.

$e'$ is a cap-piece on the shaft or spindle of the caster-wheels, provided with a pin, $e''$, sliding in a groove, $e'''$, having a hooked head, as clearly shown by Fig. 12. This pin $e''$ fits into a groove, $e'''$, in the cap-piece $e$, and thereby prevents the turning or moving of the caster-wheels in a lateral direction when in the act of plowing; but by attaching a cord or wire, $e''''$, to the hook and carrying it to the driver's seat the caps $e$ may be lifted, and the spindles or shafts of the caster-wheels will then be free to turn in their journals at the end of the furrow or field. The positions of these caster-wheels may be adjusted by means of the slots in the bar A. The vertical position of the caster-wheels may also be adjusted so as to level the plow by means of the levers or rods $E'$, and held in the desired position by engaging the same with the teeth of the rack-bars $E''$.

G represents the plow-beam, which is made of two longitudinal bars, centrally braced and united at the ends, as clearly shown by Fig. 4 of the drawings, the clevis or draft-hook being secured to the forward end of the beam. The plow-beam is pivoted to the frame A by means of a device which is shown in detail by Fig. 13 of the drawings, consisting of a plate or disk, H, which is hinged or pivoted to the bar A. H' is a triangular plate, which is centrally pivoted to the plate H, and has bifurcated ends or arms $h$, which extend rearwardly, and constitute the journal-bearings for another circular plate or disk, I. A triangular plate, I', similar to the plate H', is pivoted to the under side of the plate I, its bifurcated ends or arms $i$ being pivoted to the plow-beam. $h'$ is a spring, one end of which is secured to the plate H', and the other passes down into one or other of the holes formed through the plate H, thereby locking the plates H H'.

H and I have a forward, backward, and up-and-down movement, while H' and I' have a lateral movement, for the adjustment of the plow.

The plate I is locked in the same manner, and by means of levers $h''$ the ends of the springs $h'$ may be lifted out of the holes in the circular plates, and their position be changed relatively.

The operation of this device will be hereinafter more fully set forth.

J is a lever, which is secured to the under side of the plate H, and passes rearward to the driver's seat, its forward end $j$ being bent, to prevent the forward end of the plow-beam G from rising too high in the act of raising the plow out of the ground, as shown clearly in Fig. 2 of the drawings.

$j'$ is a rod secured to the plow-beam, and passing diagonally upward and forward therefrom, so that its free end will come in contact with the bent portion $j$ of the lever J, and prevent the plow-beam swinging forward too far.

K represents a revolving colter of peculiar construction—that is, its periphery is indentured or formed with arc-shaped knife-edges $k$, and the flat ends of the arc serve as propellers, to give continuous and steady motion to the gearing.

K' is a circular saw, having knife-edged teeth or blades, for cutting stalks or weeds. The colter has a gear-wheel, $k'$, secured to it, the teeth of which interlock or gear with a pinion, $k''$, secured to the circular saw K', so that the saw revolves with increased speed, and effectually cuts any stalks or weeds with which it comes in contact. The periphery or rim of the gear-wheel $k'$ is smooth, and acts as a gage-wheel, to prevent the colter running too deep.

L is a finger, which projects downward, with its point running slightly in the ground, and forward of the circular saw. The upper edge of this finger is knife-edged, and at the point where the teeth of the saw pass it it is made double, so that the saw passes between two cutting-edges, $l\ l'$, as shown by Fig. 16.

L' is a guide-rod, secured to the finger L, the office of which is to carry or direct the cut stalks to the plow-point, and away into the furrow from the colter.

The colter, stalk-cutter, &c., are journaled in suitable bearings in hangers M, which are adjustably secured to the plow-beam, and the relative positions of the colter and saw are also made adjustable.

N represents the plow, which is secured to the beam by means of a post, $n$, said post being formed of a double and bent bar. One of the plates of the beam passes between the doubled portion of the post until the top of the post $n$ bears against the shoulder $n''$ (see Fig. 5) raised on the top edge of the plate passing between the bars of the post $n$, while the other passes outside and is formed into a bearing-shoulder, $n'$. A thumb-screw, $n''$, secures all together, which is also used as a means of adjusting the forward end of the beam.

O represents the mold-board of the plow, the forward portion of which is of the usual form, except that it is made longer and flatter toward the point than is customary. The rear end of the mold-board is extended by curving the plate into a spiral, O', and still farther to the rear in the form of an inclined ribbon, O'', so as to correspond with the natural position assumed by the ribbon of sod or furrow-slice as it is cut and turned by the plow.

P is the land-side plate, which has an arrow-head slot, p, two bolt-holes formed through it, and the forward end is made with V-shaped beveled edges q'''. P' is a plate, formed similar to plate P, on the furrow side of the plow, which is secured between the bars of the post n, and with it constitutes the frame-work of the plow. The post n is made of a bar bent or doubled, as before described, and as clearly indicated by dotted lines in Fig. 5 of the drawings, and the plate P is secured to these bars and plate P' by bolts p' and V-shaped beveled end q''' fitting into the corresponding beveled shoulders of the arrow-headed point.

Q is the plow-point, which is the same at both ends and on top, bottom, and sides, so that it can be reversed when one end or side gets worn out. It is formed with arrow-head projections q, which fit into the corresponding slots in the plates P P', and V-shaped beveled shoulders q' formed in the sides of the arrow-headed projection q, which fits over the corresponding ends of plates P P', and is thereby held in position. (See Figs. 5 and 6.) The lower bar of the post n also comes under the point and supports it in its position. The middle portion of the point Q is made thicker at the center and tapers down to the diagonal beveled shoulders q'', made on the top and bottom above the projection q, (see Fig. 7;) and corresponding beveled shoulders are made in the top edges of plates P P', to secure the forward end of the mold-board. The point Q is not weakened by perforation or bolts passing through it. The mold-board is bolted to the land-side plate by a bolt, r, and its forward end is shouldered so as to fit corresponding shoulders on the plow-point plates P P' and share, the latter being supported by the bent portion of the post and grooves q'''' made in the sides of the arrow-headed point, running parallel with the top edge down to the center, near the point. (Shown by Fig. 6.) The share is made detachable at pleasure.

R is a rod, one end of which is hinged by hook-and-eye coupling to the rear side of the plow. This rod passes up diagonally to the frame-bar A and through a sleeve, r', loosely pivoted to a plate, r'', which is also loosely pivoted to the bar A. The rod is formed with serrated teeth s, and a spring-pawl, S, engages with said teeth. The object of this device is to relieve the friction on the land-side.

T T' represent concave wheel-colters or revolving mold-boards, which are supported in proper bearings by brackets t, which are secured to the mold-board, and have sharp edges on both sides of the mold-boards for scrapers, as clearly shown by the drawings.

These revolving mold-boards are arranged to follow the plow, and serve to scrape or remove and fill the crevice or joint between the furrows, to prevent the grass from growing up between the said furrows. They also serve, when the seeding device is in operation, to cover the seed after it is dropped.

U represents a seeding device, which is supported by a bracket, t', secured to the mold-board O'. u is a tube secured to the bottom of the box U, which conducts the seed to the seed-covering devices T'.

V is a rimless wheel, journaled in a bracket, t'', one or more of the spokes of which have lateral projections v, which, as the wheel revolves, through contact of the ends of the spokes with the ground, come in contact with the bent end of a rod, V', and push said rod forward, a spring, v', bringing the rod back to its former position when the pin passes. A reciprocating motion is thus imparted to the rod V'. The other end of this rod V' connects with a seed-slide formed of two plates, W W', having holes w w'. These slides are arranged to operate one on each side of a diagonal plate, W'', in the seed-box, which also has a hole, x, in it. The seed passes through the hole in the upper plate, then through the hole in the plate W'', and drops through into the seed-tube when the hole in the lower plate comes opposite the hole x. When the seeding device is not desired to operate, a lever, Y, having a forked end, is brought down into a groove formed across the end of the slides W, and thereby prevents the reciprocation of the rod Y'.

It will be seen that the raising or lowering of the plow is effected by the operation of the lever J, first raising the point, and then raising the entire plow above the ground when desired. The lever Z, which connects with the device I, is employed to operate said device, and move the plow laterally, as indicated by the dotted lines in Fig. 13 of the drawings.

Having thus described my invention, what I claim as new, and desire to secure by Letters Patent, is—

1. A plow having a mold-board constructed substantially as described, with the parts O O' O'', so as to turn over the furrow-slice smoothly and evenly without breaking, substantially as set forth.

2. In combination with a plow having a mold-board constructed substantially as described, the concave revolving mold-boards T, arranged to scrape smooth and fill up the crevice or joint between the furrows, substantially as set forth.

3. In combination with a plow, N, constructed substantially as described, and with the revolving mold-boards T, a seeding device, U, consisting of the rimless wheel V, rod V', spring v', and seed-cup slides W W', constructed and operating substantially as and for the purpose specified.

4. The combination, in a plow, of the mold-board O O' O", plates P P', point Q, post n, and beam G, substantially as and for the purpose specified.

5. The sulky-frame consisting of the bent bar A, wheel B, spindle b, and caster-wheels E E, substantially as and for the purpose set forth.

6. In combination with the bar A, wheel B, and spindle b, the slotted plate C, which permits of the wheel rising without affecting the working position of the plow, substantially as set forth.

7. In combination with the bar A, wheel B and spindle b, and plate C, the spring c, operating substantially as and for the purpose specified.

8. The combination of the plate C, bar A, spindle b, and spring c with the levers c' and c", substantially as and for the purpose specified.

9. The plow-post n and plow-beam G, constructed, as described, of two plates, one passing through between the doubled portion of the post and the other overlapping it, as described, in combination with the adjusting-screw, substantially as and for the purpose specified.

10. In combination with the frame A and plow-beam G, the adjusting devices H H' and I I', which also constitute the means for hinging the beam to the frame, substantially as set forth.

11. The combination of the colter K and circular-saw cutter K', geared together, so as to operate substantially as and for the purpose specified.

12. The lever J, having the forward bent portion j', operating in combination with the frame A and devices H H' and I I' to raise and lower the plow, and with the rod j to limit its forward swinging movement, substantially as set forth.

13. The combination of the plate H and adjustable cap-plate H', having bifurcated journal-bearing arms, substantially as and for the purpose specified.

14. The revolving colter K, constructed with arc-shaped knives or indentations, and so as to leave flat propelling-points arranged at right angles to the cutting-edges, substantially as set forth.

15. The serrated rod R, pivoted sleeve r', and spring-pawl S, in combination with plate r", and with the frame A and plow, substantially as and for the purpose specified.

16. In combination with a perforated plate, H, and adjustable cap H', spring-pin h', for the purpose of adjustment, substantially as set forth.

17. The lever Z, in combination with the frame A and adjustable devices H' and I', for the purpose of adjusting the lateral movement of the beam while the point remains in its proper position, substantially as set forth.

In testimony that I claim the foregoing as my own I affix my signature in presence of two witnesses.

JAY BOSTWICK FISHER.

Witnesses:
D. G. STUART,
GEO. F. GRAHAM.